Patented July 27, 1948

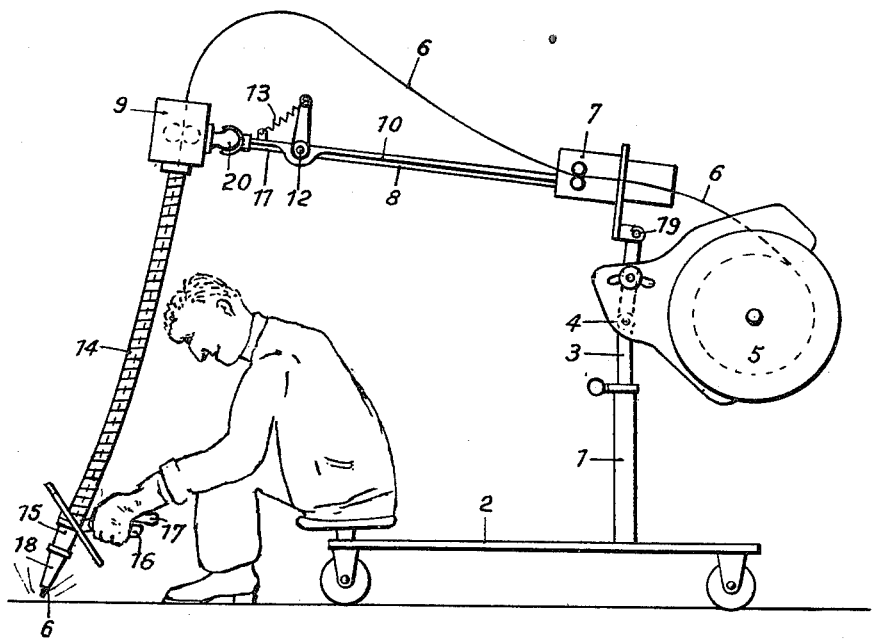

2,445,863

UNITED STATES PATENT OFFICE 2,445,863

MACHINE FOR ARC WELDING WITH CONTINUOUS ELECTRODES

Robert Sarazin, Neuilly sur Seine, France

Application June 26, 1945, Serial No. 601,605
In France January 8, 1944

1 Claim. (Cl. 219—8)

My present invention has for its object semi-automatic machines such as are used for welding with the electric arc by means of a mechanically driven continuous electrode wire and it is particularly applicable to machines of this kind wherein the electrode wire is wound off a reel and is fed towards the electrode of the arc through the cooperation of two synchronized driving devices of which one is located near the reel and draws the wire from the reel for delivering it into a guideway leading to the other driving device which is carried by a gun held by the operator and urges the wire towards the arc, the synchronization of the driving action of the two devices being obtained either through electric parts or through a mechanical connection such as a yielding transmission for instance.

In my French Patent No. 859,717, filed on May 23, 1939, I have described a machine for arc welding by means of a metallic electrode which comprises such a double driving means acting on the electrode wire and which is characterized by the fact that the feeding reel, the driving devices, the electrode carrier and the electrode section comprised between the reel and the welding zone are equilibrated by means of yielding parts which exert a return action which has a tendency to balance the weight or the reactions of these several movable parts during welding and consequently make the task of the welder easier.

Such machines, which are fully satisfactory when one makes use of small diameter wires showing therefore a comparatively reduced stiffness, are somewhat unsatisfactory in certain applications which require wires the diameter of which reaches 4 millimeters and more because in this case the wrist of the welder should overcome at each moment the reactions opposed by the wire by reason of its greater stiffness. Such reactions are still apparent even if one uses very flexible wires such as electrodes of the type disclosed in my application Serial No. 601,604, filed June 26, 1945, when these flexible wires are of a large diameter.

My present invention has for its object to do away with these reactions of the electrode wire which are a hindrance for the welder while he is controlling the arc and which lay upon him a supplementary strain. My invention allows giving the workman a maximum ease in the welding even when the latter requires large diameter wires.

In conformity with the invention, the driving and guiding of the electrode wire are obtained in machines of the type recalled hereinabove, from the reel up to the welding arc, through the combination of three different mechanical parts through which the electrode wire passes in succession: the first part exerts a powerful unwinding tractional action on the wire forming a coiled ring carried by the reel and directs said wire towards the second part which causes also the wire to progress, in synchronism with the first part, and which is lighter than said first part and may be advantageously balanced while following almost exactly the changes in position of the welder; finally the third part which is not a driving part is held in the welder's hands and receives the electrode wire propelled by the two first parts and acts only as a guide for leading this wire up to the welding point.

Owing to the different duties performed by the different parts feeding the electrode wires, it is apparent that on one hand the second driving part which has no effort to provide for unwinding the wire from the reel may be executed under a light form of small bulk and that it is possible to exactly balance its weight whereby it cannot produce any substantial strain or inconvenience for the workman; on the other hand, the latter who is freed from the weight and bulk of said driving part carries in his hand only a mere handle provided with a nozzle adapted to direct towards the arc the electrode wire and consequently he receives no more any inconvenient reaction as the wire which arrives up to him without any jerks and at the required speed is delivered to him through the agency of an equilibrated driving part.

In accordance with a particularly advantageous form of execution of the invention the second driving part is connected with the terminal guiding part through a flexible duct of suitable length, but preferably rather short so as to avoid the jerks due to the friction arising generally in such a type of sheaths, said duct continuing under the form of a guiding tube ending with the outlet nozzle for the electrode serving also as a current lead, which nozzle carries one or two operating handles which the welder may take hold of by hand.

I have described hereinbelow and illustrated in accompanying drawing by way of example two forms of execution of machines provided with the advantageous features disclosed hereinabove.

Fig. 1 illustrates in a diagrammatical manner a first form of execution;

Fig. 2 is a modification.

In Fig. 1, the whole machine is carried by a hollow shaft 1 rigid with a carriage 2. Inside said shaft 1 may slide an arm 3 adapted to be rigidly held at a suitable height, said arm 3 carrying through the agency of a pivot 4 an adjustable reel 5 from which may be unwound the electrode wire 6. This unwinding is performed through the drawing action of a first driving part 7 connected through an arm or bracket 8, preferably rigid, with a second driving part 9 to which it transmits the driving motion by means of a flexible cable 10 housed within said bracket 8.

The second driving part 9 which is carried by the arm 11 pivotally secured at 12 to the end of the bracket 8 and constantly submitted to the action of a spring 13 is followed by a yielding hose 14 the length of which will be as short as possible as allowed by the work to be performed. This hose guides the electrode wire 6 up to a tube 15 held in the welder's hand through the agency of one or two handles such as 16—17, said tube 15 ending under the form of a guiding nozzle 18 in the vicinity of the welding arc.

The system of the driving parts and of the guiding part may rock on the stationary axis 19.

The second driving part 9 is pivotally secured preferably through the agency of a rotula 20 at the extremity of the arm 11. The balancing of the complete system including the guiding nozzle is ensured through elastic parts not shown inserted between the reel and the first driving part.

The particular balancing of the second driving part and of its auxiliary elements is ensured by the spring 13. It is apparent that the welding workman carries in his hand an extremely light tool of reduced bulk which is perfectly balanced. This makes the welding operation much easier although this operation is particularly delicate as it requires the keeping up of an arc of comparatively short length.

Moreover by reason of its light weight the tool formed by the nozzle and the tube 15 may receive without any prohibitive addition of weight a screen protecting the workman against the obnoxious radiations of the arc, which mounting it has not been possible to execute heretofore in a perfectly satisfactory manner.

In the example of Fig. 2, relating to a machine particularly adapted for welding in proximity of ground, the reel 5 which is carried by a rolling frame 21 allows the electrode wire 6 to unwind inside a sheath 22 mounted in a balanced manner on the reel and containing the first driving part.

This sheath 22 extends under the form of a rigid tube 29 which is followed by a hose 24 through which the electrode wire passes with the flexible cable used for driving. Said hose fitted over the large coil spring 25 is connected with the second driving part 9 which takes up the electrode wire 6 and propels it through the flexible hose 14 ending as in the precedent case under the form of a guiding tube 15 with a nozzle 18 in the immediate proximity of the welding arc.

The system of equilibrating springs not shown bearing against the reel and of the elastic hose 24–25 entirely relieves the welder's hand during operation and has even a tendency to slightly raise the nozzle 18.

What I claim is:

A machine for arc welding comprising a reel carrying a provision of coiled electrode wire, a support for adjustably carrying said reel, a pivot on said support, a first driving part adapted to rock round said pivot and adapted to exert an unwinding tractional action on the electrode wire on the reel, a bracket rigid with the first driving part, an arm pivotally secured to said bracket, a balancing spring connecting said arm with said bracket, a second driving part pivotally secured to said arm and adapted to make the electrode wire progress in synchronism with the action of the first driving part, a flexible sheath at the outlet of the second driving part through which the electrode wire is adapted to pass, a guiding tube at the outlet of said sheath, a nozzle for guiding the electrode wire and leading the current ending said tube and means for directing said guiding nozzle on to the welding point and means for balancing the system comprising the driving and guiding parts round the pivot carried by the support.

ROBERT SARAZIN.

REFERENCES CITED

The following references are of record in the file of this patent:

UNITED STATES PATENTS

| Number | Name | Date |
|---|---|---|
| 1,853,609 | Goodspeed | Apr. 12, 1932 |
| 1,927,896 | Meller | Sept. 26, 1933 |
| 2,355,983 | Long | Aug. 15, 1944 |